(12) United States Patent
Siekman et al.

(10) Patent No.: US 11,972,008 B2
(45) Date of Patent: Apr. 30, 2024

(54) DATA STORE WITH DYNAMIC FILTERING FOR INCREASED ACCESSIBILITY AND ENHANCED SECURITY

(71) Applicant: Bank of America Corporation, Charlotte, NC (US)

(72) Inventors: James Siekman, Charlotte, NC (US); Aubrey Breon Farrar, Sr., Waldorf, MD (US); Mohamed Faris Khaleeli, Charlotte, NC (US); Patricia Ann Albritton, Charlotte, NC (US); Sheila Page, Charlotte, NC (US); Mark Alan Odiorne, Waxhaw, NC (US); Marcus R. Matos, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 207 days.

(21) Appl. No.: 17/848,551

(22) Filed: Jun. 24, 2022

(65) Prior Publication Data
US 2023/0418962 A1 Dec. 28, 2023

(51) Int. Cl.
G06F 21/00 (2013.01)
G06F 16/9532 (2019.01)
G06F 21/51 (2013.01)
G06F 21/62 (2013.01)

(52) U.S. Cl.
CPC ...... *G06F 21/6218* (2013.01); *G06F 16/9532* (2019.01); *G06F 21/51* (2013.01); *G06F 2221/2141* (2013.01)

(58) Field of Classification Search
CPC ... G06F 16/9532; G06F 21/51; G06F 21/6218
See application file for complete search history.

(56) References Cited

U.S. PATENT DOCUMENTS

2022/0327119 A1* 10/2022 Gasper ................. G06F 16/906

* cited by examiner

*Primary Examiner* — Jeffrey C Pwu
*Assistant Examiner* — Thong P Truong
(74) *Attorney, Agent, or Firm* — Weiss & Arons LLP (57) ABSTRACT

Apparatus and methods for integrating data from multiple computer-based communication platforms and dynamically adjusting search results for search queries received from each of the computer-based communication platforms in response to unique security settings is provided. The methods may include a system. The system may include a centralized database for receive indicators of concern ("IOCs") from the communication platforms and tag each IOC with an identifier associated with a communication platform from which the IOC was received. The system may also include an API for modifying search queries received from the communication platforms and applying the modified search queries to the centralized database. The system may further include a dynamic filter for dynamically adjusting search results based at least in part on an originator of a search query.

20 Claims, 6 Drawing Sheets

DATA STORE WITH DYNAMIC FILTERING FOR INCREASED ACCESSIBILITY AND ENHANCED SECURITY

FIELD OF TECHNOLOGY

Aspects of the disclosure relate to risk data processing. In particular, aspects of the disclosure relate to providing enhanced security and accessibility for processed risk data.

BACKGROUND

Large enterprises typically identify multiple incidents of concern ("IOC") while servicing their customers. Exemplary IOCs may include a compromised website of a customer or vendor, an unauthorized attempt to access a customer account over the telephone or via e-mail, the hacking of a database, and any other data identifying possible malicious activity or security breaches.

Various entities included in a large enterprise generate their own IOCs. It is desirable for enterprise data to be shared between the various entities to maximize risk prevention. However, each entity may have different data sharing requirements, security protocols, and varying baselines for whether an IOC is to be treated as a risk or not. It would be desirable, therefore, for providing systems and methods that allow disparate entities to benefit from risk data while, concurrently, addressing the security concerns and unique risk needs of each entity.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus and methods for providing increased accessibility to risk data while enhancing data security is provided. The apparatus and methods may include one or more communication platforms, databases, APIs, dynamic filters, and any other suitable apparatus described herein. The apparatus and methods may be described below as a system, however other embodiments, computer-executable method steps, apparatus, methods, or any other suitable embodiments, may implement the measures described as being performed by the system.

The system may be configured to integrate data from multiple computer-based communication platforms and dynamically adjust search results for search queries received from each of the computer-based communication platforms in response to unique security settings.

The system may include a centralized database. The centralized database may be configured to receive indicators of concern ("IOCs") from one, two, or a plurality of communication platforms. Exemplary communication platforms may include data feeds from one or more entities such as various lines of business within an enterprise or different businesses. A communication channel may be a call center, an online retail website, or any other suitable information feed.

An exemplary IOC may be a compromised IP address, a compromised email account, a fraudulent IP domain, a fraudulent email address, or any other suitable data identifying a potential malicious actor, security breach, etc. The centralized database may normalize a data format of each of the received IOCs to conform to a standardized data format.

The centralized database may tag each IOC received with an identifier associated with a communication platform from which the IOC was received. This may be used later to decide if a communication channel transmitting a search query, at a later time, has permissions to view the IOC.

The centralized database may execute a data merging algorithm to group IOCs together into datasets. Each dataset may store two or more IOCs and identifiers tagged to the stored IOCs. The data merging algorithm may identify two or more IOCs sharing one or more characteristics and store, in each dataset, the identified two or more IOCs sharing the one or more characteristics. Exemplary characteristics may include a domain name, a name of an individual/company associated with the IOC, an email address stored in the IOC, or any other suitable data.

The system may include an application programming interface ("API"). The API may be configured to receive search queries from communication platforms. In exemplary embodiments, the API may receive search queries from various entities within a large enterprise, or from different businesses/corporations. For example, an entity attempting to set up a new account for a user may transmit user data, such as a username, e-mail address, etc., to the API to see if the centralized database stores any data relating to the user that may be relevant to assess a risk factor, if any, associated with the user.

The API may be configured to receive, from a first communication platform, a search query including a first search term. The API may append to the first search term a first identifier associated with the first communication platform. In some embodiments, the API may be further configured to modify the search query and apply the modified search query to the centralized database.

The modification may include searching a relational database to identify a second search term, the second search term being associated, in the relational database, with the first communication platform and the first search term. The API may then the augment the search query to include the second search term. In some embodiments, the API may append to the second search term a generic identifier. The generic identifier may be associated with any search terms identified in the relational database by the API. In other embodiments, the API may augment the search query to include the second search term and append to the second search term the first identifier.

The modifying of the search query to include an additional search term may enable robust querying of the centralized database to include an additional search term stored in the relational database and return better search results then the first search term alone. For example, the first search term may be a customer name and the second search term may be a customer e-mail address. The first search term may be an email account and the second search term may be a name of a customer associated with the email account.

The API may be configured to search the centralized database for both the first search term and the second search term. The searching may return a result identifying a first IOC including the first search term and a second IOC including the second search term. It is to be understood that, in some embodiments, the searching may return a null result for one or both of the first search term and the second search term. When a null result is returned, the null result may be transmitted back to the first communication platform.

The API may transmit the first IOC and the second IOC to the dynamic filter. The dynamic filter may be configured to dynamically adjust the search results based at least in part on an originator of a search query—i.e., the communication platform which transmitted the search query to the API. As such, the data transmitted back to the first communication platform may or may not include the data retrieved by the API from the centralized database.

In some embodiments, when an identifier associated with the first IOC matches the first identifier of the first communication platform, the dynamic filter may transmit the first IOC to the first communication platform.

When the identifier associated with the first IOC does not match the first identifier of the first communication platform, the dynamic filter may run an artificial intelligence ("AI") algorithm trained with risk data labeled as acceptable or unacceptable to the first communication platform to determine if the first IOC identifies a risk to the first communication platform. This may address each communication channel's unique tolerance levels for risk. As such, the dynamic filter may create, and store, a distinct algorithm for each communication channel, trained with risk data labeled as acceptable or unacceptable for each communication channel. When search results are received by the dynamic filter from the API, the dynamic filter may use the communication platform identifier to retrieve the trained algorithm associated with the communication platform identifier. For example, when the first communication channel requests a search, and IOCs are retrieved that are associated with an identifier that identifies a second communication channel (or any communication channel different from the first communication channel), an algorithm associated with the first communication channel may be used to process the IOCs and generate a binary output.

The AI algorithm may generate an output. The output may be a binary output—such as 'risk' or 'no risk,' yes' or 'no', or any other suitable binary output. The binary output may be transmitted to the first communication platform by the dynamic filter. The output may not be binary. The output may include a risk level, a subset of the data stored in the IOC, suggested remedial action, or any other output for which the AI algorithm can be trained to output.

In some embodiments, when an identifier associated with the first IOC is included in a first group of identifiers, the dynamic filter may transmit the first IOC to the first communication platform. The first group of identifiers may identify entities or company which allow each other to share their uploaded IOC data.

When the identifier associated with the first IOC is included in a second group of identifiers, the dynamic filter may run the AI algorithm to transmit the output, such as the binary output. This may include, as described above, running the AI algorithm trained with risk data labeled as acceptable or unacceptable to the first communication platform to determine if the first IOC identifies a risk to the first communication platform. The dynamic filter may then transmit a binary output of the AI algorithm to the first communication platform. The second group of identifiers may identify entities for which communication platforms cannot access their uploaded IOC data.

When the identifier associated with the first IOC is included in a third group of identifiers, the dynamic filter may transmit a complete dataset including the first IOC to the first communication platform. The third group of identifiers may identify communication platforms for which all users of the system can access their uploaded IOCs and related data.

The groups of identifiers, and the associated action to be taken, may be stored on the API and/or the centralized database.

In embodiments where the second search term is appended with the generic identifier, the dynamic filter may execute one of the following actions: transmit the second IOC to the first communication platform, transmit the second IOC to the AI algorithm, or transmit a complete dataset including the second IOC to the first communication platform. In other embodiments where the second search term is appended with a generic identifier, the dynamic filter may run the AI algorithm to determine if the second IOC identifies a risk to the first communication platform and transmit a second binary output of the AI algorithm to the first communication platform.

In embodiments where the second search term is appended with the first identifier, the dynamic filter may, when an identifier associated with the first IOC matches the first identifier of the first communication platform, transmit the first IOC and the second IOC to the first communication platform. When the identifier associated with the first IOC does not match the first identifier of the first communication platform, the dynamic filter may: retrieve a risk profile associated with the first communication platform; run the AI to determine if one or both of the first IOC and the second IOC identifies a risk to the first communication platform; and transmit to the first communication platform a first binary output from the AI algorithm associated with the first IOC and a second binary output from the AI algorithm associated with the second IOC.

In some embodiments, after the execution of the data merging algorithm, the data sets may be enriched. The data algorithm, the enriching of the data sets, and other functions described as being executed on data uploaded to, and stored in, the centralized database, may be executed by the API or a different program. Steps described herein as being executed by the centralized database may be executed by the API or a different program or application being run by the systems and methods of the invention.

The data enrichment may include, for each dataset, extracting an individual name or company name from the dataset, searching one or more publicly available databases to retrieve information associated with the extracted individual name or company name, and adding the retrieved information to the dataset.

The AI algorithm may be a first AI algorithm. The data enrichment may further include the centralized database executing a routine to normalize the datasets, the normalizing including, for each dataset, feeding the dataset to the second AI algorithm trained with training datasets tagged as either risk or non-risk, the training datasets tagged as risk being training datasets including known profiles of risk-based activity, and the training datasets tagged as non-risk being known profiles of acceptable activity. When the second AI algorithm determines that the dataset do not match the risk training datasets by a predetermined confidence factor, the centralized database may delete the dataset from the centralized database.

In some embodiments, when the AI algorithm determines that the dataset does match the risk training datasets by the predetermined confidence factor, the centralized database may maintain the dataset in the centralized database.

In some embodiments, when the second AI algorithm determines that the dataset does not match the risk training datasets by a predetermined confidence factor, the centralized database may move the dataset from the centralized database to a queue. When, after the moving of the dataset to the queue, a new IOC is received having at least one characteristic similar to data stored in the dataset, the centralized database may augment the dataset to include the new IOC, upload the augmented dataset to the centralized database, and feed the augmented dataset to the second AI algorithm again for reprocessing. This may enable previously received data which, in its received state, was not enough to identify a risk, to be held for future use in case additional data is received which, together with the original data, identifies a potential risk based on the confidence factors used by the AI algorithm.

Method steps executed by elements of the system described herein may be implemented as a computer executable method. The computer executable method may be a method for integrating data from multiple computer-based communication platforms and dynamically adjusting search results for search queries received from each of the computer-based communication platforms in response to unique security setting. The method may comprise extracting computer readable instructions stored on a non-transitory medium and executing the computer readable instructions on a processor. Execution of the computer readable instructions by the processor may perform the methods described herein by the centralized database, the API, and the dynamic filter as described herein.

The apparatus, systems and methods described herein that enable tagging of the IOCs with identifiers associated with their originating communication platform may enable communication platforms to leverage all IOC data stored in the centralized database while, at the same time, not allowing access to data originated from a different communication platform unless the data was uploaded by that platform itself.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or programs or by utilizing computer-readable data structures.

Figure 1:
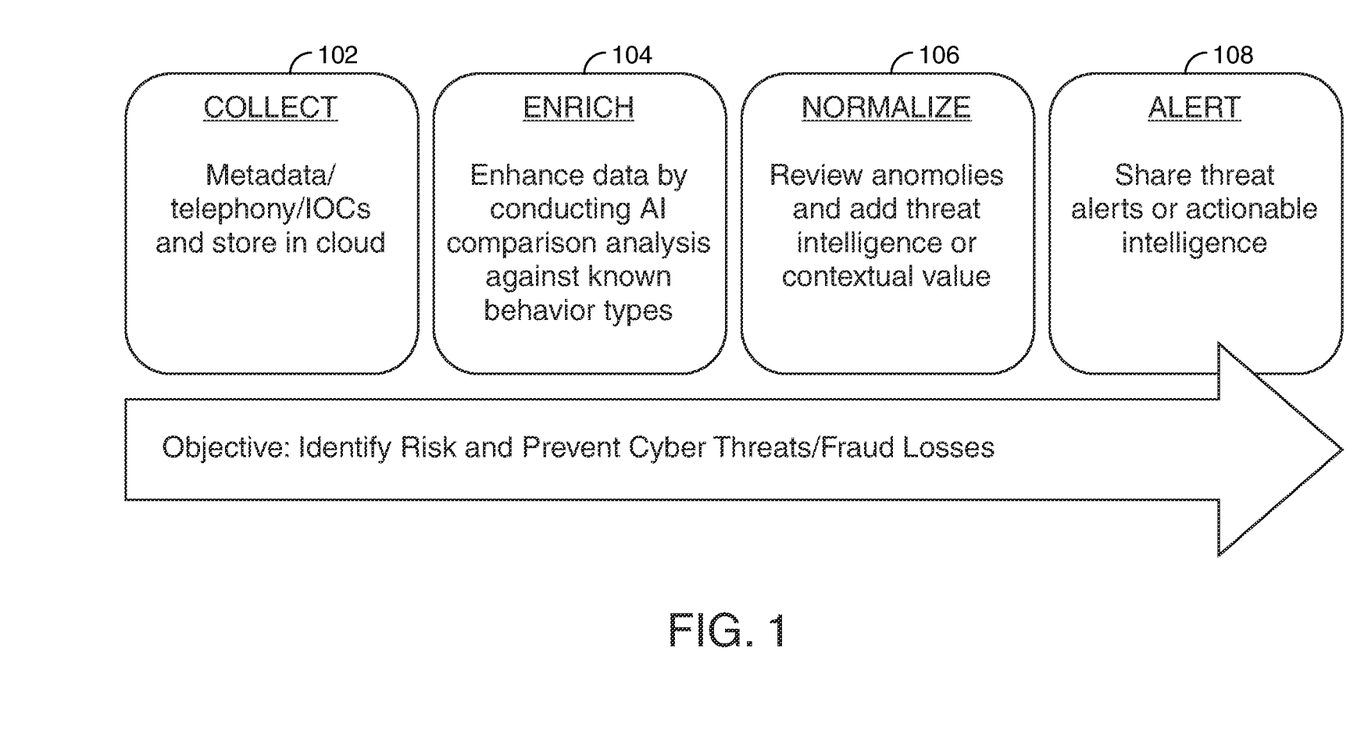
FIG. 1 shows illustrative methods in accordance with the invention.

FIG. 1 shows an exemplary method in accordance with the invention. At step 102, data may be collected for feeding to the centralized database. The data may include metadata created by a system, IOCs, and/or risk data created by a telephony network. This data may be stored in a cloud. The centralized database may be hosted by a cloud. The data may be stored in a cloud on the centralized database. At step 104, the data may be enriched. The data enrichment may include enhancing stored data, such as the stored datasets, by using the second AI algorithm to compare the datasets against training datasets fed to the second AI algorithm during training that are either tagged as identifying risk factors or not identifying risk factors. At step 106, the data may be normalized. The normalizing may include deleting datasets that do not pass the second AI algorithm's threshold. The normalizing may include adding data to the datasets by searching publicly or privately held databases. At step 108, the method may include sharing threat alerts or actionable intelligence with internal or external users.

Figure 2:
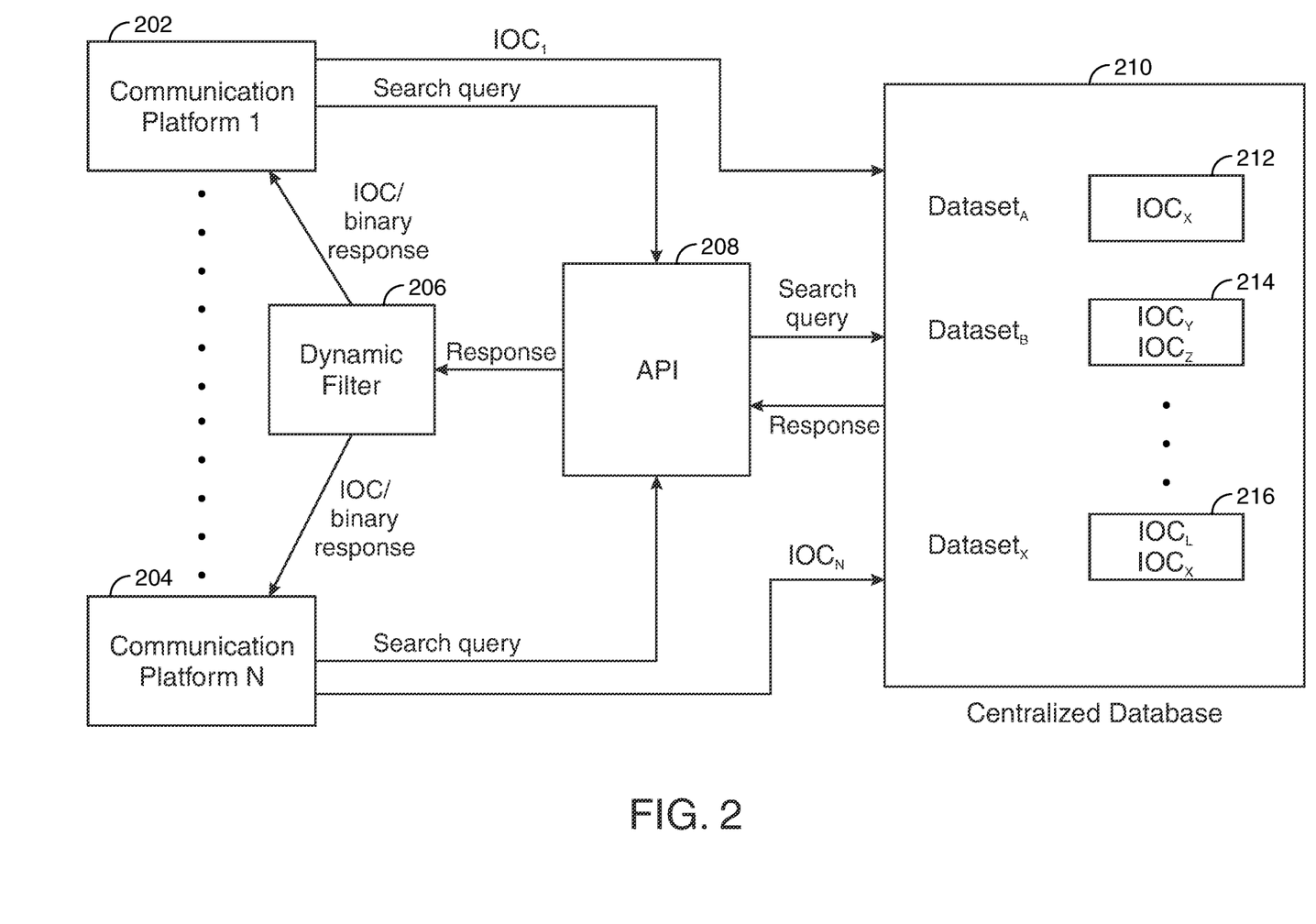
FIG. 2 shows illustrative apparatus and methods in accordance with the invention.

FIG. 2 shows illustrative apparatus and methods in accordance with the invention. In FIG. 2, communication platform 202 and communication platform 204 are shown transmitting IOCs to centralized database 210. Communication platform 202 is illustrated as transmitting $IOC_1$ to centralized database 210. Communication platform 204 is illustrated as transmitting $IOC_N$ to centralized database 210. It is to be understood that the communication platforms may each transmit multiple IOCs to centralized database 210. The apparatus and methods may include multiple additional communication platforms not illustrated in FIG. 2.

Centralized database 210 is shown as storing $Dataset_A$ $Dataaset_B$ and $Dataset_X$. Centralized database 210 may store any number of datasets. $Dataset_A$ may include data 212, $Dataaset_B$ may include data 214 and $Dataset_X$ may include data 216. Exemplary IOCs which may be included in the data stored by the datasets is illustrated in FIG. 2.

Communication platform 202 and communication platform 204 may each transmit a search query to API 208. API may run the search queries on centralized database 201 and receive responses. The responses may be transmitted to dynamic filter 206. Dynamic filter 206 may use one or more of the decisioning processes described herein to decide whether to return IOCs, datasets, and/or responses, which may be binary, to communication platform 202 and communication platform 204.

Figure 3:
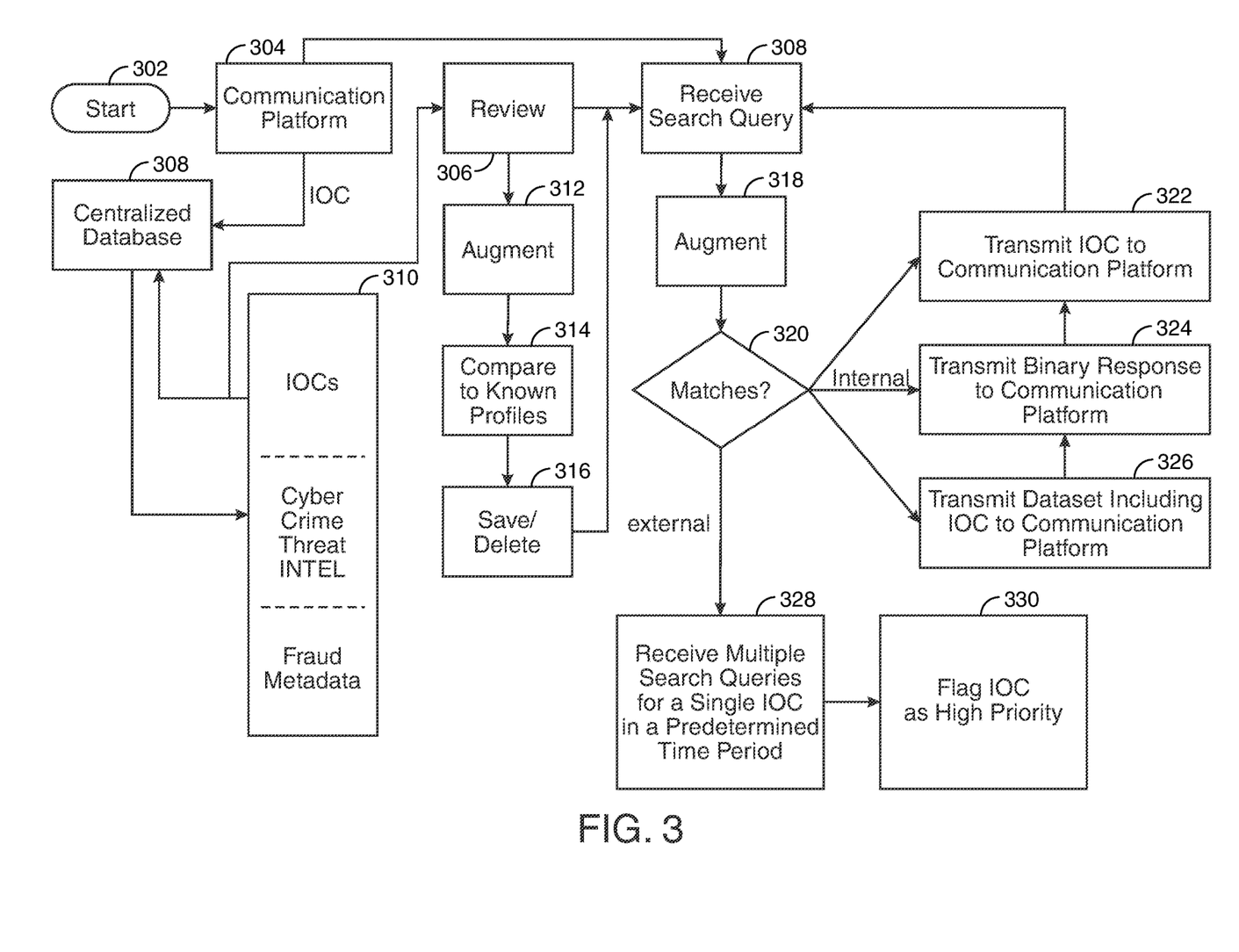
FIG. 3 shows illustrative apparatus and methods in accordance with the invention.

FIG. 3 shows exemplary apparatus and methods in accordance with the invention. The method may start at step 302. At step 304, Communication platform 304 may transmit data to centralized database 308. The data may be IOCs or any other suitable data. At step 308, centralized database may receive data from communication platform 304. At step 310, data may be uploaded to, and extracted from the centralized database, including IOCs, Cyber Crime Threat Intelligence, and/or fraud metadata. At step 306, data stored in centralized database may be reviewed. At step 312, the data may be augmented with additional data as described herein. At step 314, the datasets may be compared to known profiles using trained second AI algorithms as described herein. At step 316, the datasets may be either saved in their augmented form or deleted. At step 304, a search query may be received by the API from the communication platform. At step 318, the search query may be augmented by the API. At step 320, the API may determine whether IOCs identified in the centralized database when running the search query match an identifier of the communication platform from which the search query was received.

Based on the decisioning factors described herein, the API may execute one of the following steps: at step 322, transmit the IOC to the communication platform, at step 324, transmit a binary response to the communication platform (the binary response received from the first AI algorithm), or, at step 326, transmit the dataset including the IOC to the communication platform.

At step 328, the centralized database may determine that multiple search queries were received that, when run, identify a single IOC, within a predetermined time period. The centralized database may execute this determination by storing in a queue all IOCs retrieved by the API when searching the centralized database during a time period at least as long as the predetermined time period. Based on this determination, an IOC may be flagged as high priority when it was retrieved by more than a threshold number of queries during the predetermined time period. Flagging an IOC as high priority may result in the IOC being transmitted back to the communication platform from which it was received (which may be identified based on the identifier associated with the IOC). If the IOC is associated with a customer account, a soft lockdown or a hard lockdown on the account may be automatically enforced.

Figure 4:
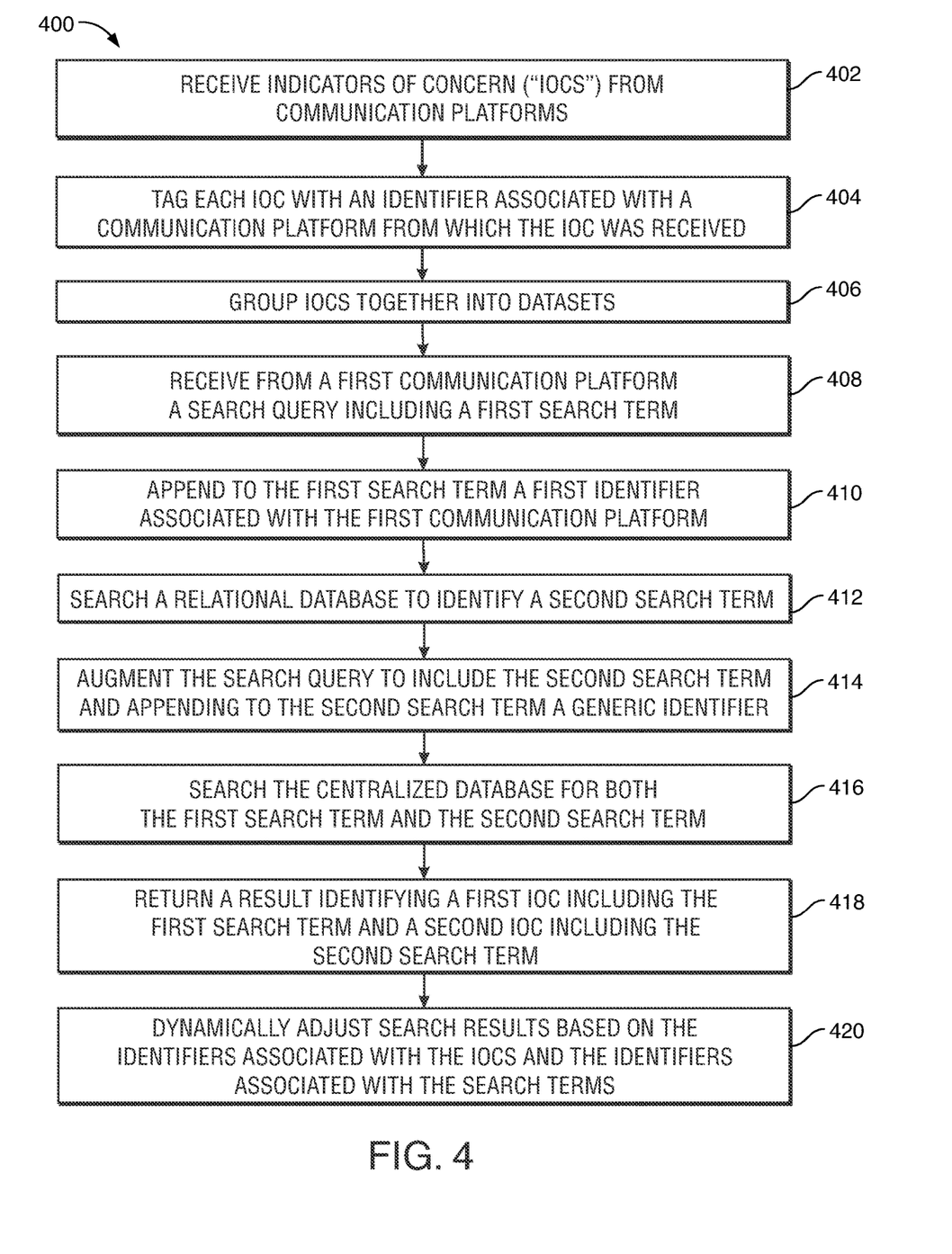
FIG. 4 shows illustrative methods in accordance with the invention.

FIG. 4 shows an exemplary method in accordance with the invention. The method illustrated in FIG. 4 may include one or more of steps 402-420. The methods in accordance with the invention may also include steps described herein but not illustrated in FIG. 4. The method may include, at step 402, receiving indicators of concern ("IOCs") from communication platforms. The method may include, at step 404, tagging each IOC with an identifier associated with a communication platform from which the IOC was received. The method may include, at step 406, grouping IOCs together into datasets.

The method may include, at step 408, receiving from a first communication platform a search query including a first search term. The method may include, at step 410, appending to the first search term a first identifier associated with the first communication platform. The method may include, at step 412, searching a relational database to identify a second search term. The method may include, at step 414, augmenting the search query to include the second search term and appending to the second search term a generic identifier. The method may include, at step 416, searching the centralized database for both the first search term and the second search term. The method may include, at step 418, returning a result identifying a first IOC including the first search term and a second IOC including the second search term. The method may include, at step 420, dynamically adjusting search results based on the identifiers associated with the IOCs and the identifiers associated with the search terms.

Figure 5:
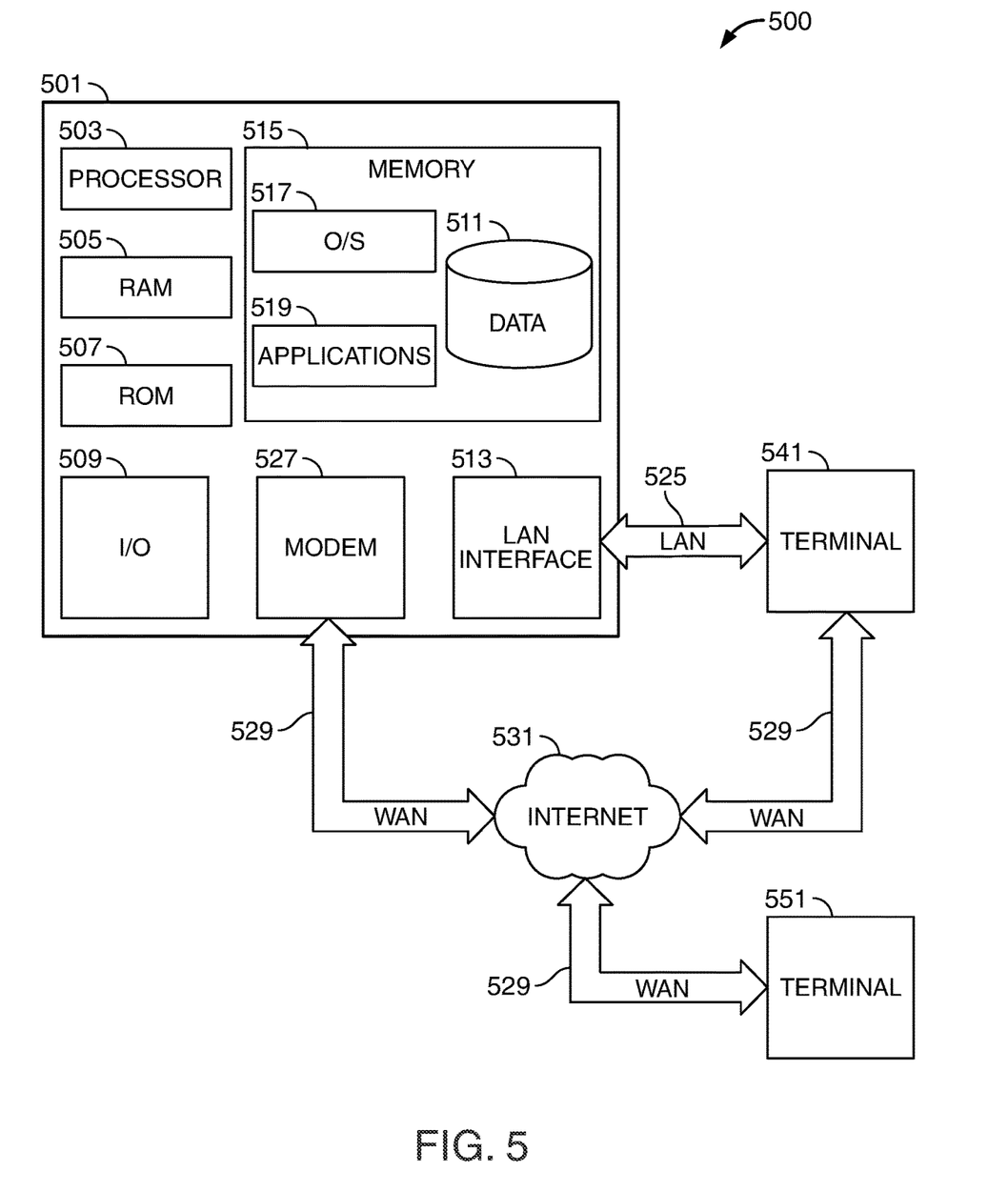
FIG. 5 shows illustrative block diagram of apparatus in accordance with the invention.

FIG. 5 shows an illustrative block diagram of system 500 that includes computer 501. Computer 501 may alternatively be referred to herein as a "system," "engine," "server" or a "computing device." Computer 501 may be a workstation, desktop, laptop, tablet, smart phone, mobile device, or any other suitable computing device. Elements of system 500, including computer 501, may be used to implement various aspects of the systems and methods disclosed herein. Apparatus described herein, including the communication platforms, dynamic filter, API, and the centralized database, may include some or all of the elements and apparatus of system 500.

Computer 501 may have a processor 503 for controlling the operation of the device and its associated components, and may include RAM 505, ROM 507, input/output circuit 509, and a non-transitory or non-volatile memory 515. Machine-readable memory may be configured to store information in machine-readable data structures. The processor 503 may also execute all software running on the computer—e.g., the operating system and/or voice recognition software. Other components commonly used for computers, such as EEPROM or Flash memory or any other suitable components, may also be part of the computer 501.

The memory 515 may be comprised of any suitable permanent storage technology—e.g., a hard drive. The memory 515 may store software including the operating system 517 and application(s) 519 along with any data 511 needed for the operation of computer 501. Memory 515 may also store videos, text, and/or audio assistance files. The data stored in Memory 515 may also be stored in a database, a temporary cache, or any other suitable memory.

Input/output ("I/O") module 509 may include connectivity to a microphone, keyboard, touch screen, mouse, and/or stylus through which input may be provided into computer 501. The input may include input relating to cursor movement. The input/output module may also include one or more speakers for providing audio output and a video display device for providing textual, audio, audiovisual, and/or graphical output. The input and output may be related to computer application functionality. The input may be input by the user.

Computer 501 may be connected to other systems via a local area network (LAN) interface 513. Computer 501 may operate in a networked environment supporting connections to one or more remote computers, such as terminals 541 and 551. Terminals 541 and 551 may be personal computers or servers that include many or all of the elements described above relative to computer 501. The network connections depicted in FIG. 5 include a local area network (LAN) 525 and a wide area network (WAN) 529, but may also include other networks. When used in a LAN networking environment, computer 501 is connected to LAN 525 through a LAN interface 513 or an adapter. When used in a WAN networking environment, computer 501 may include a modem 527 or other means for establishing communications over WAN 529, such as Internet 531. Connections between Computer 501 and Terminals 551 and/or 541 may be used for connections between firewall filter 117 and one or more of process 119, system configuration 123 and process 121.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 519, which may be used by computer 501, may include computer executable instructions for invoking functionality related to communication, such as e-mail, Short Message Service (SMS), and voice input and speech recognition applications. Application program(s) 519 (which may be alternatively referred to herein as "plugins," "applications," or "apps") may include computer executable instructions for invoking functionality related to performing various tasks. Application programs 519 may utilize one or more algorithms that process received executable instructions, perform power management routines or other suitable tasks. Application programs 519 may utilize one or more decisioning processes used by the AI algorithms, the API, the dynamic filter and/or the centralized database.

Application program(s) 519 may include computer executable instructions (alternatively referred to as "programs"). The computer executable instructions may be embodied in hardware or firmware (not shown). The computer 501 may execute the instructions embodied by the application program(s) 519 to perform various functions.

Application program(s) 519 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 511, and any other suitable information, may be stored in memory 515. One or more of applications 519 may include one or more algorithms that may be used execute the data merging algorithm, the search query augmentation, the AI algorithms, and any of the other decisioning methods described herein.

The invention may be described in the context of computer-executable instructions, such as applications 519, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 501 and/or terminals 541 and 551 may also include various other components, such as a battery, speaker, and/or antennas (not shown). Components of computer 501 may be linked by a system bus, wirelessly or by other suitable interconnections. Components of computer 501 may be present on one or more circuit boards. In some embodiments, the components may be integrated into a single chip. The chip may be silicon-based.

Terminal 551 and/or terminal 541 may be portable devices such as a laptop, cell phone, Blackberry™, tablet, smartphone, or any other computing system for receiving, storing, transmitting and/or displaying relevant information. Terminal 551 and/or terminal 541 may be one or more user devices. Terminals 551 and 541 may be identical to computer 501 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 6:
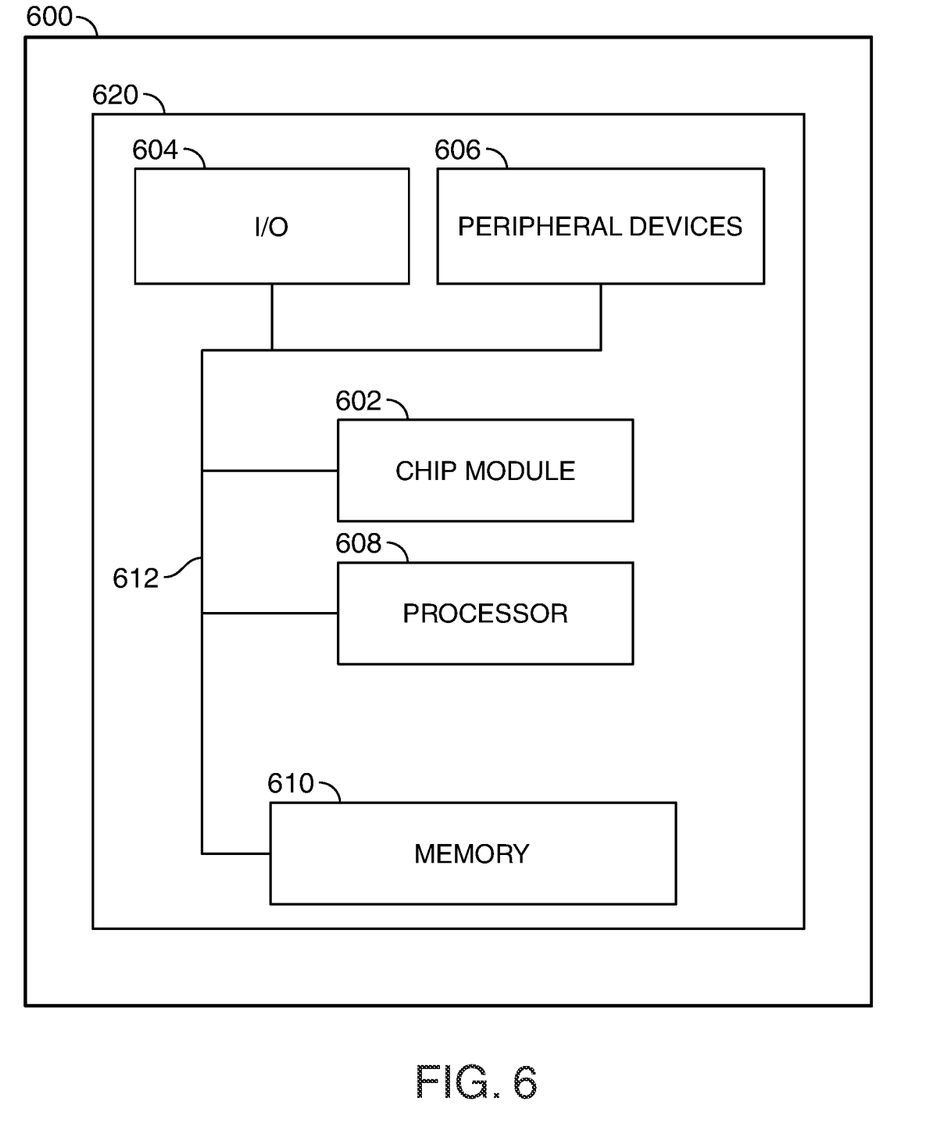
FIG. 6 shows illustrative apparatus that may be configured in accordance with the invention.

FIG. 6 shows illustrative apparatus 600 that may be configured in accordance with the principles of the disclosure. Apparatus 600 may be a computing device. Apparatus 600 may include one or more features of the apparatus shown in FIG. 5. Apparatus 600 may include chip module 602, which may include one or more integrated circuits, and which may include logic configured to perform any other suitable logical operations.

Apparatus 600 may include one or more of the following components: I/O circuitry 604, which may include a transmitter device and a receiver device and may interface with fiber optic cable, coaxial cable, telephone lines, wireless devices, PHY layer hardware, a keypad/display control device or any other suitable media or devices; peripheral devices 606, which may include counter timers, real-time timers, power-on reset generators or any other suitable peripheral devices; logical processing device 608, which may compute data structural information and structural parameters of the data; and machine-readable memory 610.

Machine-readable memory 610 may be configured to store in machine-readable data structures: machine executable instructions, (which may be alternatively referred to herein as "computer instructions" or "computer code"), applications such as applications 519, signals, and/or any other suitable information or data structures.

Components 602, 604, 606, 608 and 610 may be coupled together by a system bus or other interconnections 612 and may be present on one or more circuit boards such as circuit board 620. In some embodiments, the components may be integrated into a single chip. The chip may be silicon-based.

Thus, systems and methods for secure risk data storage and processing are provided. Persons skilled in the art will appreciate that the present invention can be practiced by other than the described embodiments, which are presented for purposes of illustration rather than of limitation.

What is claimed is:

1. A system for integrating data from multiple computer-based communication platforms and dynamically adjusting search results for search queries received from each of the computer-based communication platforms in response to unique security settings, the system comprising:

a centralized database configured to:
- receive indicators of concern ("IOCs") from the communication platforms;
- tag each IOC with an identifier associated with a communication platform from which the IOC was received; and
- execute a data merging algorithm to group IOCs together into datasets, each dataset storing two or more IOCs and identifiers tagged to the stored IOCs;

an application programming interface ("API") for modifying search queries received from the communication platforms and applying the modified search queries to the centralized database, the API being configured to:
- receive, from a first communication platform, a search query including a first search term;
- append to the first search term a first identifier associated with the first communication platform;
- search a relational database to identify a second search term, the second search term being associated, in the relational database, with the first communication platform and the first search term;
- augment the search query to include the second search term and appending to the second search term a generic identifier, the generic identifier being associated with any search terms identified in the relational database by the API;
- search the centralized database for both the first search term and the second search term to return a result identifying a first IOC including the first search term and a second IOC including the second search term; and
- transmit the first IOC and the second IOC to a dynamic filter;

the dynamic filter for dynamically adjusting search results based at least in part on an originator of a search query, the filtering including:
- when an identifier associated with the first IOC matches the first identifier of the first communication platform, transmitting the first IOC to the first communication platform;
- when the identifier associated with the first IOC does not match the first identifier of the first communication platform:
  - running an artificial intelligence ("AI") algorithm trained with risk data labeled as acceptable or unacceptable to the first communication platform to determine if the first IOC identifies a risk to the first communication platform; and
  - transmitting a binary output of the AI algorithm to the first communication platform; and
- in response to the second search term being associated with the generic identifier, transmitting the second IOC to the first communication platform;

wherein:
the tagging of the IOCs with identifiers associated with their originating communication platform allows communication platforms to leverage all IOC data stored in the centralized database while, at the same time, not allowing access to data originated from a different communication platform.

2. The system of claim 1 wherein an IOC is selected from a group consisting of a compromised IP address, a compromised email account, a fraudulent IP domain and a fraudulent email address.

3. The system of claim 1 further comprising normalizing a data format of each of the IOCs to conform to a standardized data format.

4. The system of claim 1 wherein the data merging algorithm is configured to identify two or more IOCs sharing one or more characteristics and storing, in each dataset, the identified two or more IOCs sharing one or more characteristics.

5. The system of claim 4 further comprising the centralized database executing a routine to enrich the datasets, the enriching including, for each dataset:
- extracting an individual name or company name from the dataset;
- searching one or more publicly available databases to retrieve information associated with the extracted individual name or company name; and
- adding the retrieved information to the dataset.

6. The system of claim 5, when the AI algorithm is a first AI algorithm, further comprising the centralized database executing the routine to normalize the datasets, the normalizing including, for each dataset:
- feeding the dataset to a second AI algorithm trained with training datasets tagged as either risk or non-risk, the training datasets tagged as risk being training datasets including known profiles of risk-based activity;
- when the AI algorithm determines that the dataset does not match the risk training datasets by a predetermined confidence factor, deleting the dataset from the centralized database; and
- when the AI algorithm determines that the dataset does match the risk training datasets by the predetermined confidence factor, maintaining the dataset in the centralized database.

7. The system of claim 5, when the AI algorithm is a first AI algorithm, further comprising the centralized database executing the routine to normalize the datasets, the normalizing including, for each dataset:
- feeding the dataset to a second AI algorithm trained with training datasets tagged as either risk or non-risk, the training datasets tagged as risk being training datasets including known profiles of risk-based activity;
- when the second AI algorithm determines that the dataset does not match the risk training datasets by a predetermined confidence factor, moving the dataset from the centralized database to a queue; and
- when the second AI algorithm determines that the dataset does match the risk training datasets by the predetermined confidence factor, maintaining the dataset in the centralized database;

wherein:
if, after the moving of the dataset to the queue, a new IOC is received having at least one characteristic similar to data stored in the dataset, augmenting the dataset to include the IOC, uploading the augmented dataset to the centralized database, and feeding the augmented dataset to the second AI algorithm.

8. The system of claim 1 wherein the first search term is a customer name and the second search term is a customer e-mail address.

9. The system of claim 1 wherein the first search term is an email account and the second search term is a name of a customer associated with the email account.

10. A system for integrating data from multiple computer-based communication platforms and dynamically adjusting search results for search queries received from each of the computer-based communication platforms in response to unique security settings, the system comprising:

a centralized database configured to:
   receive indicators of concern ("IOCs") from the communication platforms;
   tag each IOC with an identifier associated with a communication platform from which the IOC was received; and
   execute a data merging algorithm to group IOCs together into datasets, each dataset storing two or more IOCs and identifiers tagged to the stored IOCs;
an application programming interface ("API") for modifying search queries received from the communication platforms and applying the modified search queries to the centralized database, the API being configured to:
   receive, from a first communication platform, a search query including a first search term;
   append to the first search term a first identifier associated with the first communication platform;
   search a relational database to identify a second search term, the second search term being associated, in the relational database, with the first communication platform and the first search term;
   augment the search query to include the second search term and appending to the second search term a generic identifier, the generic identifier being associated with any search terms identified in the relational database by the API;
   search the centralized database for both the first search term and the second search term to return a result identifying a first IOC including the first search term and a second IOC including the second search term; and
   transmit the first IOC and the second IOC to a dynamic filter;
the dynamic filter for dynamically adjusting search results based at least in part on an originator of a search query, the filtering including:
   when an identifier associated with the first IOC is included in a first group of identifiers, transmitting the first IOC to the first communication platform;
   when the identifier associated with the first IOC is included in a second group of identifiers:
      running an artificial intelligence ("AI") algorithm trained with risk data labeled as acceptable or unacceptable to the first communication platform to determine if the first IOC identifies a risk to the first communication platform; and
      transmitting a binary output of the AI algorithm to the first communication platform; and
   when the identifier associated with the first IOC is included in a third group of identifiers, transmitting a complete dataset including the first IOC to the first communication platform;
wherein:
   the tagging of the IOCs with identifiers associated with their originating communication platform allows communication platforms to leverage all IOC data stored in the centralized database while, at the same time, not allowing access to data originated from a different communication platform.

11. The system of claim 10 further comprising in response to the second search term being associated with the generic identifier, transmitting the second IOC to the first communication platform.

12. The system of claim 10 further comprising in response to the second search term being associated with the generic identifier, transmitting a complete dataset including the second IOC to the first communication platform.

13. The system of claim 10, when the binary output is a first binary output, further comprising in response to the second search term being associated with the generic identifier:
   running the AI algorithm to determine if the second IOC identifies a risk to the first communication platform; and
   transmitting a second binary output of the AI algorithm to the first communication platform.

14. The system of claim 10 further comprising normalizing a data format of each of the IOCs to conform to a standardized data format.

15. The system of claim 10 wherein the first search term is an email account and the second search term is a name of a customer associated with the email account.

16. A computer executable method for integrating data from multiple computer-based communication platforms and dynamically adjusting search results for search queries received from each of the computer-based communication platforms in response to unique security setting, the method comprising extracting computer readable instructions stored on a non-transitory medium and executing the computer readable instructions on a processor, wherein execution of the computer readable instructions by the processor performs the method of:
   at a centralized database:
      receive indicators of concern ("IOCs") from the communication platforms;
      tag each IOC with an identifier associated with a communication platform from which the IOC was received; and
      execute a data merging algorithm to group IOCs together into datasets, each dataset storing two or more IOCs and identifiers tagged to the stored IOCs;
   at an application programming interface ("API") for modifying search queries received from the communication platforms and applying the modified search queries to the centralized database:
      receive, from a first communication platform, a search query including a first search term;
      append to the first search term a first identifier associated with the first communication platform;
      search a relational database to identify a second search term, the second search term being associated, in the relational database, with the first communication platform and the first search term;
      augment the search query to include the second search term and appending to the second search term the first identifier;
      search the centralized database for both the first search term and the second search term to return a result identifying a first IOC including the first search term and a second IOC including the second search term; and
      transmit the first IOC and the second IOC to a dynamic filter;
   at the dynamic filter, the dynamic filter for dynamically adjusting search results based at least in part on an originator of a search query:
      when an identifier associated with the first IOC matches the first identifier of the first communication platform, transmitting the first IOC and the second IOC to the first communication platform;
      when the identifier associated with the first IOC does not match the first identifier of the first communication platform:

running an artificial intelligence ("AI") algorithm trained with risk data labeled as acceptable or unacceptable to the first communication platform to determine if one or both of the first IOC and the second IOC identifies a risk to the first communication platform; and transmitting to the first communication platform a first a first binary output from the AI algorithm associated with the first IOC and a second binary output from the AI algorithm associated with the second IOC;

wherein:

the tagging of the IOCs with identifiers associated with their originating communication platform allows communication platforms to leverage all IOC data stored in the centralized database while, at the same time, not allowing access to data originated from a different communication platform.

17. The computer executable method of claim 16 wherein the data merging algorithm is configured to identify two or more IOCs sharing one or more characteristics and storing, in each dataset, the identified two or more IOCs sharing one or more characteristics.

18. The computer executable method of claim 17 when the AI algorithm is a first AI algorithm, further comprising, at centralized database, executing the routine to normalize the datasets, the normalizing including, for each dataset:

feeding the dataset to a second AI algorithm trained with training datasets tagged as either risk or non-risk, the training datasets tagged as risk being training datasets including known profiles of risk-based activity;

when the AI algorithm determines that the dataset does not match the risk training datasets by a predetermined confidence factor, deleting the dataset from the centralized database; and when the AI algorithm determines that the dataset does match the risk training datasets by the predetermined confidence factor, maintaining the dataset in the centralized database.

19. The computer executable method of claim 17 when the AI algorithm is a first AI algorithm, further comprising, at the centralized database, executing the routine to normalize the datasets, the normalizing including, for each dataset:

feeding the dataset to a second AI algorithm trained with training datasets tagged as either risk or non-risk, the training datasets tagged as risk being training datasets including known profiles of risk-based activity;

when the second AI algorithm determines that the dataset does not match the risk training datasets by a predetermined confidence factor, moving the dataset from the centralized database to a queue; and when the second AI algorithm determines that the dataset does match the risk training datasets by the predetermined confidence factor, maintaining the dataset in the centralized database;

wherein:

if, after the moving of the dataset to the queue, a new IOC is received having at least one characteristic similar to data stored in the dataset, augmenting the dataset to include the IOC, uploading the augmented dataset to the centralized database, and feeding the augmented dataset to the second AI algorithm.

20. The computer executable method of claim 16 further comprising, at the centralized database, executing a routine to enrich the datasets, the enriching including, for each dataset:

extracting an individual name or company name from the dataset;

searching one or more publicly available databases to retrieve information associated with the extracted individual name or company name; and adding the retrieved information to the dataset.

* * * * *